United States Patent
Stephan et al.

(10) Patent No.: US 6,263,556 B1
(45) Date of Patent: Jul. 24, 2001

(54) TEMPERATURE COMPENSATING GAS SPRING STRUT AND METHOD OF MAKING

(75) Inventors: Craig Hammann Stephan, Ann Arbor, MI (US); David Gerald Baack, Louisville, KY (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/427,894

(22) Filed: Oct. 27, 1999

(51) Int. Cl.[7] .................................................. F16F 9/43
(52) U.S. Cl. ...................... 29/428; 267/64.14; 267/64.25; 267/64.28
(58) Field of Search ............................ 267/64.11, 64.12, 267/64.14, 64.25, 64.26, 64.28

(56) References Cited

U.S. PATENT DOCUMENTS

| | | | |
|---|---|---|---|
| 3,751,023 | * 8/1973 | Thomas | 267/64.12 |
| 4,597,565 | 7/1986 | Smith . | |
| 4,613,115 | * 9/1986 | Smith | 267/64.25 |
| 4,646,884 | * 3/1987 | Yang | 267/64.28 |
| 4,854,554 | 8/1989 | Ludwig . | |
| 5,161,786 | * 11/1992 | Cohen | 267/64.12 |
| 5,839,719 | 11/1998 | Hosan et al. . | |

* cited by examiner

Primary Examiner—Robert J. Oberleitner
Assistant Examiner—Devon Kramer
(74) Attorney, Agent, or Firm—Joseph W. Malleck

(57) ABSTRACT

An apparatus and a method of making an automatic temperature compensating gas spring strut, the method comprising providing an outer cylinder having opposite ends with one end closed and the other end apertured to permit movement of the strut therethrough; nesting an inner cylinder within the outer cylinder with radial space therebetween, the inner cylinder being apertured at opposite ends; partitioning the space between said cylinders into a first chamber adjacent the closed end of the outer cylinder and a second chamber remote from such closed end; inserting a piston in sliding, sealing relation with the interior of the inner cylinder, the piston having a piston rod extending from said piston and sealingly out through the aperture of the outer cylinder; after injecting a high pressure, non-condensing gas in the first chamber, inserting a measured quantity of solid carbon dioxide ("dry ice") in the second chamber at ambient conditions and closing said second chamber while sealingly allowing movement of said piston rod therethrough; and allowing the dry ice to sublime to create a condensable high pressure gas within said second chamber that is effective to exert a force on said piston rod that varies with ambient temperature conditions in the range of −40° C. to +80° C.

2 Claims, 5 Drawing Sheets

TEMPERATURE COMPENSATING GAS SPRING STRUT AND METHOD OF MAKING

TECHNICAL FIELD

This invention relates to improvements in automatic temperature compensated gas spring struts that achieve quicker, easier, and safer assembly, as well as provide temperature compensation over a wider operating temperature range, along with selectable variable damping.

BACKGROUND OF THE INVENTION

A gas spring strut is essentially a sealed cylinder containing a near ideal gas (usually nitrogen under a high pressure, typically about 1000–2000 psi) with a piston in contact with the gas to force movement of a piston rod extending from one end of the cylinder. The use of gas struts as a spring element offers many advantages, but has a major drawback in that as the ambient temperature falls, the pressure of nitrogen, which follows the ideal gas law, drops by about 26% from +8° C. to −40° C., reducing the movement force of the piston rod by the same amount. Thus, gas spring struts have the disadvantage that the force with which they expand is a function of ambient temperature. If used as an automotive liftgate strut, the rate at which the strut will lift will slow as the temperature falls, and in very cold weather, the strut may not be able to lift the liftgate completely. Attempting to fix this problem by using higher force struts may only cause the liftgate to open too rapidly at high temperatures.

U.S. Pat. No. 4,613,115 proposes a gas spring strut that has two distinctly different high pressure gas volumes separated by the seal of the piston. One of the gases is considered primary and is constituted of nitrogen, the other is a secondary gas (such as freon) that changes pressure at a faster rate with temperature than does nitrogen. The secondary gas produces a force opposing the lifting force of the nitrogen so that the net lifting force is the difference in the two forces. The pressure of the secondary gas changes with temperature in such a way that the net lifting force can remain relatively constant; the secondary gas is selected in this patent to exert an opposing force that is the vapor pressure of the system; the secondary gas must be a gas which provides a continuous two-phase gas system in which the liquid and vapor phases are in equilibrium over the temperature range of −30° C. to +80° C. Patent '115 demonstrates only three gases that remain as a two-phase system within such temperature range, namely, ammonia, freon-12, and sulfur hexafluoride. Other gases suggested were not proven to be operable in such range (such as acetylene, ethane, propane, propadiene, perfluoride propane, dimethyl ether, n-butane, hydrogen bromide, and hydrogen iodide). It is noted that the patent concept has never been offered commercially because of the difficulty of assembling the different high pressure gases into their respective volume chambers while preventing the gases from mixing by bypassing the piston seal that separates the different volume chambers. Because of this, it is also noted that the patented concept had difficulty in achieving essentially constant net operating force for the piston rod with varying temperature.

SUMMARY OF THE INVENTION

It is an object of this invention to provide an automatic temperature compensating device for gas springs that is benign, safe, and employs an economical secondary gas assembled at ambient conditions in a solid form.

It is also an object of this invention to provide an automatic temperature compensating device that ratios the pressure surfaces for the primary and secondary gases so that the net force is constant over a greater operating temperature range than that achievable by the prior art.

A further object of this invention is to provide an automatic temperature compensating device that employs a cylinder housing separate from the gas spring to alleviate the need for complex or unreliable sealing structures between the spring gas and the compensating gas.

A first aspect of this invention is a method of making an automatic temperature compensating gas spring strut, comprising: (i) providing an outer cylinder having opposite ends with one end closed and the other end apertured to permit movement of the strut therethrough; (ii) nesting an inner cylinder within the outer cylinder with radial space therebetween, the inner cylinder being apertured at opposite ends; (iii) partitioning the space between said cylinders into a first chamber adjacent the closed end of the outer cylinder and a second chamber remote from such closed end; (iv) inserting a piston in sliding, sealing relation with the interior of the inner cylinder, the piston having a piston rod extending from said piston and sealingly out through the aperture of the inner cylinder; (v) after injecting a high pressure, non-condensing gas in the first chamber, inserting a measured quantity of solid carbon dioxide ("dry ice") in the second chamber at ambient conditions which dry ice sublimes to a condensable high pressure gas within the second chamber that is effective in balancing the pressure on opposite sides of the piston to create a relatively constant net force acting on the piston rod over a greater operable temperature range.

The invention, in a second aspect, is a force providing assembly having a temperature compensating device, the assembly comprising: (a) first and second cylinders nested with the second cylinder within the first cylinder and having their interior volumes interconnected; (b) means movably dividing the interconnected volumes to define at least one closed but variable volume chamber; (c) a two-phase condensing gas in the chamber comprised of $CO_2$; (d) a force providing element remote from said cylinders; and (e) a mechanical linkage between the force providing element and said movable dividing means to transfer a net force relatively independent of ambient temperature conditions within the range of −40° C. to +80° C.

BRIEF DESCRIPTION OF THE DRAWINGS

FIG. 4 is a fragmentary view of the lower portion of the embodiment of FIG. 1 illustrating certain modifications to provide for selectable variable damping;

DETAILED DESCRIPTION AND BEST MODE

Figure 11:
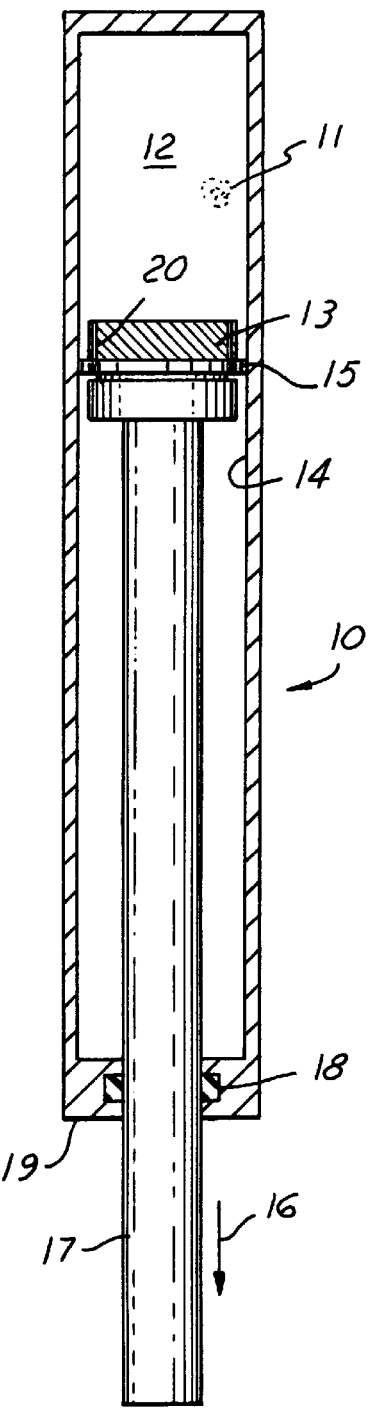
FIG. 11 is a schematic sectional view of a typical gas spring strut according to the teachings of the prior art.

A conventional prior art gas assist spring strut 10, as shown in FIG. 11, uses high pressure nitrogen gas 11 in chamber 12 above and below the piston 13 (the piston being slidable against interior wall 14 by use of a nylon washer 15) to provide an outward force 16 on the strut rod 17. The gas is sealed within the cylinder by single lipped seal 18 located in the housing end wall 19 through which the strut 17 slides. The volume of chamber 12 is chosen large enough so that, as the rod extends, a decrease in pressure of gas 11 will be relatively small to be acceptable. To control the rate at which the rod extends, the piston construction allows filtering of gas 11 therearound as well as through holes 20 therein to achieve damping as the rod moves outward. Damping is not desired in the opposite direction and therefore a bypass valve (not shown) allows greater passage of the gas 11 through the piston during compression. Thus, the essential characteristics of a conventional gas spring strut are a singular high pressure gas contained in a single chamber, a piston that is not sealed against the cylinder interior, and which piston exerts a force on the strut rod 17 that varies significantly with ambient temperature.

Figure 1:
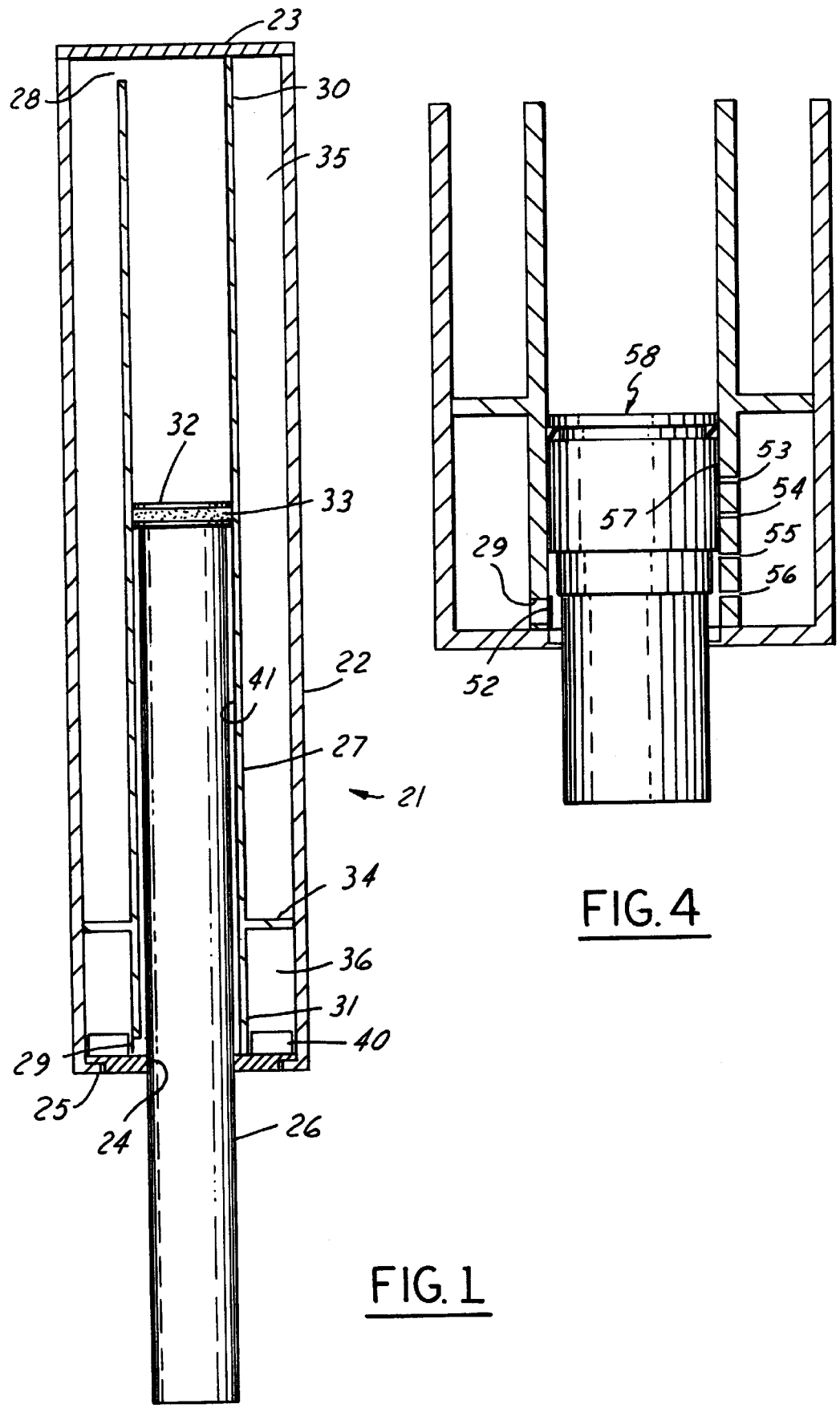
FIG. 1 is a schematic sectional view of one embodiment of this invention showing an integrated automatic temperature compensated gas spring strut.

As shown in FIG. 1, a first gas spring strut embodiment is illustrated. The device 21 has an outer cylinder 22 closed at one end 23 and has at least one aperture 24 at its other end 25 to permit movement of a piston rod 26 therethrough. An inner cylinder 27 is nested coaxially within the outer cylinder 22 in radially spaced relation. The inner cylinder 27 is apertured at 28, 29 in its opposite ends 30, 31 to permit flow of gas therethrough. A piston 32 resides on the end of the piston rod 26 and has a sliding lipped seal 33 to engage the interior of the inner cylinder 27. A partition 34, in conjunction with the piston seal 33, is employed to divide the interior volume of the cylinders into a chamber 35 adjacent the closed end 23 of cylinder 22 and a chamber 36 remote from such closed end 23. A high pressure $CO_2$ gas (pressurized to about 900 psi at 20° C.) is resident in chamber 36 and a high pressure nitrogen gas is resident in chamber 35.

The partition 34 is gas-tight and the piston 32 is slidingly sealed in a gas-tight fashion also, the latter being without damping. The piston is movable so that the relative volume of the inner cylinder occupied by each gas depends on the rod position. At the extreme top and bottom of the inner cylinder (beyond the range of motion of the piston) apertures 28 and 29 allow each gas to flow unimpeded from its section of the inner cylinder to the corresponding outer annulus for its respective chamber.

The two gases act in opposition on the piston. The nitrogen gas acting with a force equal to its pressure times the cross sectional area of the piston, tries to force the piston rod outwardly. Its action is opposed by the $CO_2$ gas, which attempts to push the rod inwardly. Since the $CO_2$ gas is in contact with a smaller portion of the piston (an area equal to the total cross sectional area of the piston minus the cross sectional area of the rod), it will, for an equal pressure, exert a smaller opposing force. It should be noted that both gases typically are at a pressure on the order of 1000 psi so the effect of atmospheric pressure on the rod is negligible.

The key to the improved temperature compensating ability of the device 21 lies in the choice of the gas used within chamber 36. The choice being $CO_2$ it achieves a two-phase system only during a portion, particularly the lower half of the operating temperature range for the device. The operating temperature range is designed to be as low as −40° C., if not lower, and an upper operating temperature maximum at +80° C. The $CO_2$ operates as a two-phase system only at temperatures below 26° C. Since the areas on which the gases act are fixed, a change in the relative pressures of the two gases will change the balance of forces on the piston rod. As observed previously, the nitrogen gas pressure decreases with temperature approximately as an ideal gas, so its contribution to the outward force on the piston rod will decrease with temperature. However, if the pressure of the $CO_2$ gas decreases at an even faster rate, then it can compensate for the loss in pressure of the nitrogen with the result that the net force on the piston rod remains more or less constant, independent of temperature. The $CO_2$ gas must then have the property that its vapor pressure is comparable to the nitrogen pressure at the maximum operating temperature.

Figure 2:
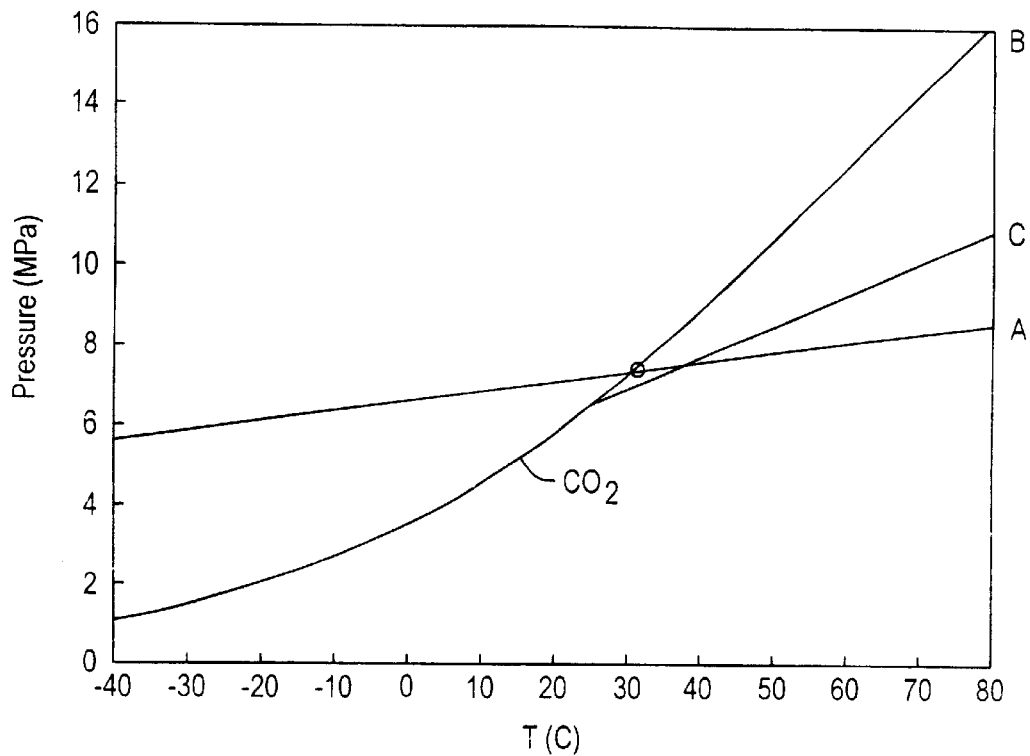
FIG. 2 is a graphical illustration of pressure as a function of temperature for $CO_2$ gas and an idealized gas.

$CO_2$ gas is selected as the critical element for this invention because of its low cost, absence of environmental drawbacks, non-flamability superior temperature compensation characteristics, and useful packaging characteristics, Carbon dioxide has a critical point temperature of 31.0° C., as shown in FIG. 2. For best temperature compensation, the quantity of $CO_2$ introduced into chamber 36 is chosen such that all the liquid evaporates before this critical point temperature is reached. This choice prevents the overcompensation that would otherwise occur. If desired, the temperature at which compensation stops can be shifted to higher or lower temperatures by introducing more or less $CO_2$ at the time of assembly or manufacture. Best temperature compensation is achieved when the $CO_2$ exists as a two-phase system only for temperatures below 26° C., which is approximately the lower half of the operating temperature range for this device (−40° C. to +40° C.).

Figure 3:
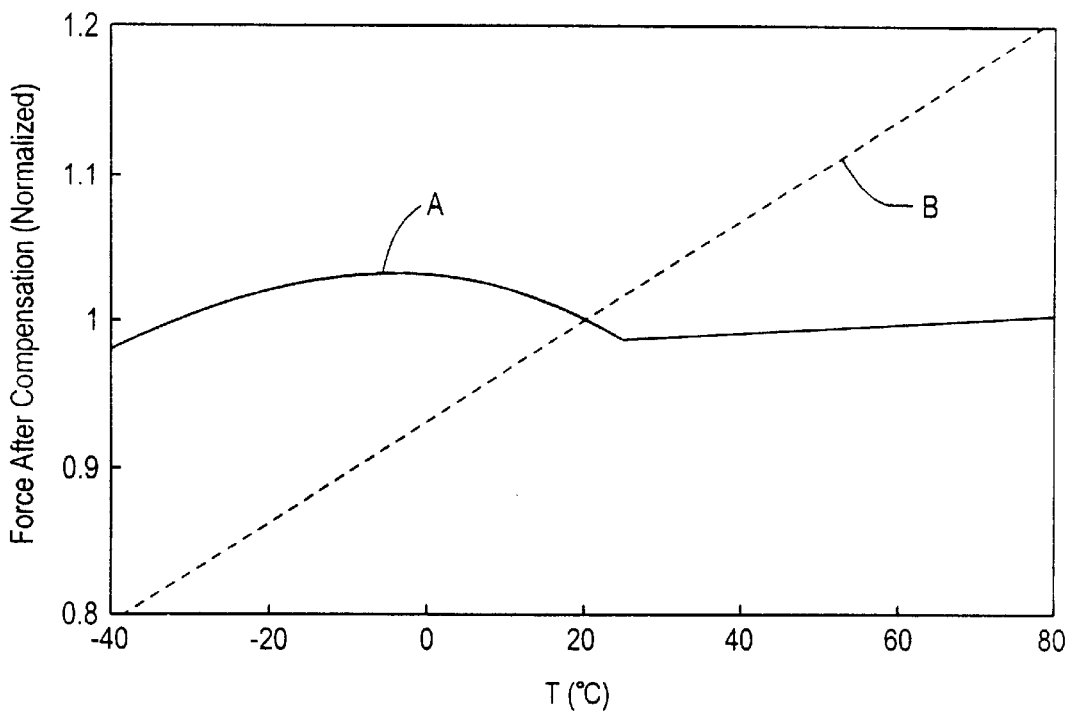
FIG. 3 is a graphical illustration of a typical automotive liftgate force as a function of temperature when compensated by use of the principles of this invention.

By choosing the ratio of piston to rod diameters correctly, extremely good temperature compensation can be achieved. Good results will occur by choosing a ratio such that the $CO_2$ produces a contracting force that is 22% of the expansion force produced by the nitrogen. The results for strut force are shown in FIG. 3; plot A is for temperature compensated and plot B is for uncompensated. With this choice of parameters, equal force variation is obtained (+2.6%) over a wider operating temperature range and particularly down to −40° C. While the force of an uncompensated strut (B) falls by 26% from +80° C. to −40° C., the temperature compensated device (A) is constant to within plus or minus 2.6% over such range.

The method herein of making an automatic temperature compensating spring strut is unique because of its gas pressurization. The prior art, such as exemplified by U.S. Pat. No. 4,613,115, requires an elaborate means for introducing and sealing two different gases at high pressure, which means is expensive and not reliable because of the type of piston seal separating the two gases. This invention uses carbon dioxide which can be introduced into the secondary gas chamber 36 without high pressure in the form of a pellet 40 of dry ice of the correct size (see FIG. 1). Such size can be, for example, 30% of the volume of chamber 36. The pellet is simply inserted into the empty chamber 36 followed by insertion of the piston 32 and rod 26. The outer cylinder is then closed at end 25 by crimp-sealing an end plate. The dry ice sublimes in pressure chamber 36 to about 900 psi. The process can be done in an ordinary atmosphere, if so desired, since the 14 psi atmospheric air trapped in the cylinder constitutes only a minor impurity (about 1.5%) in the 900 psi $CO_2$ The sequence of steps of carrying out such method comprises the following steps: (a) providing an outer cylinder 22 closed at one end 23 and apertured 24 at its other end to permit movement of a piston rod 26 therethrough; (b) nesting an inner cylinder 27 within the outer cylinder in radially spaced relationship thereto, the inner cylinder being apertured at opposite ends 28, 29; (c) partitioning 34 the space between the cylinders into a first chamber 35 adjacent the closed end of the outer cylinder and a second chamber 36 remote from the closed end; (d) after injecting a high pressure, noncondensing gas (i.e., $N_2$) into the first chamber, closing the first chamber by inserting a piston 32 into sliding, sealing relationship with the interior of the inner cylinder 27, the piston having a piston rod extending out therefrom; (e) inserting a measured quantity 40 of dry ice into the second chamber at ambient conditions and closing the second chamber while allowing movement of the piston rod therein; and (f) allowing the dry ice to sublime to create a condensable high pressure gas within the second chamber that is effective in balancing the pressures on the opposite sides of said piston to create a relatively constant net force acting on the piston rod, regardless of operable temperature variations within a desired range.

Figure 5:
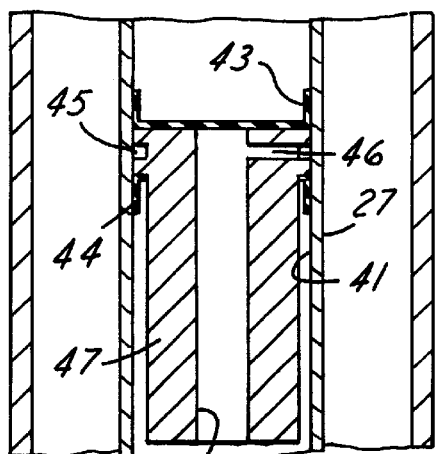
FIGS. 5 and 6 are fragmentary views of a portion of FIG. 1 illustrating respectively modifications to provide for a seal design that increases the sealing function under greater gas pressure either in a vented or an unvented condition.

In the embodiment of FIG. 1, the two high pressure gases must be prevented from mixing together by prevention of filtering past the piston 32 by use of lip seal 33. Such a simple single lip seal works best if there is a large pressure difference in the correct direction across the seal, which pressure difference acts to push the single lip of the seal against the sealing surface 41. Since the two compressed gases can have comparable pressures, a large positive pressure difference may not always occur across a single lip seal in the piston and may actually change sign as temperature and rod position change (see FIG. 2). As shown in FIG. 5, the two lip seal construction 42 employed by this invention facilitates the use of a sliding seal that effectively separates generally equal or comparable high pressure gases. The annular flexible lips 43, 44 are separated by an annular groove 45. The solid piston rod is replaced by a tube 47 whose central opening 48 connects via port 46 to this groove 45 at one end and connects to atmosphere at the other end. In this way, each lip 43, 44 is pressed tightly against the inner surface 41 of the cylinder 27 by the full pressure of the respectively pressurized gases.

Figure 6:
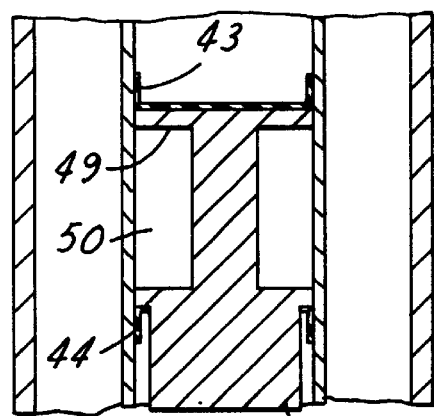

As shown in FIG. 6, a variation of the pressure assisted lip seal is illustrated; the solid piston rod 48 may be retained. In this situation, groove 49 is much wider to provide a chamber 50 of some desired capacity. This chamber is originally at atmospheric pressure but as long as the rate of gas leakage past the seals is low, the pressure in the chamber 50 will not approach the pressure in chambers 35, 36 during the life of the strut, thereby allowing the dual lips to be pressed tightly against the inner surface 41 of the cylinder 27 at all times.

Gas spring struts are frequently used with liftgates or hood panels in automobiles. For smooth, gradual lifting of the gate or hood, it is desirable to provide variable damping of the opening force as it is raised so that it is not raised jarringly or abruptly, but rather opens swiftly but slows gradually to a smooth stop at its raised position. As shown in FIG. 4, damping according to this invention is provided by closing one of the gas bleed apertures 29 with a check valve 52. While a bleed hole for either the nitrogen or the condensable $CO_2$ could be chosen, there are advantages to choosing the condensable gas bleed hole. Such bleed hole 29 is sealed by the check valve 52 which opens when the strut is compressed, allowing free passage of gas without damping. However, during the expansion of the strut, the check valve closes and the $CO_2$ gas must pass instead through a series of small holes 53, 54, 55, 56, creating variable damping. By arranging the holes as shown, one after another of the holes is blocked off by the skirt 57 of the piston 58 as it moves downward, increasing the damping effect at the end of the stroke and bringing the liftgate to a gradual stop.

Figure 7:
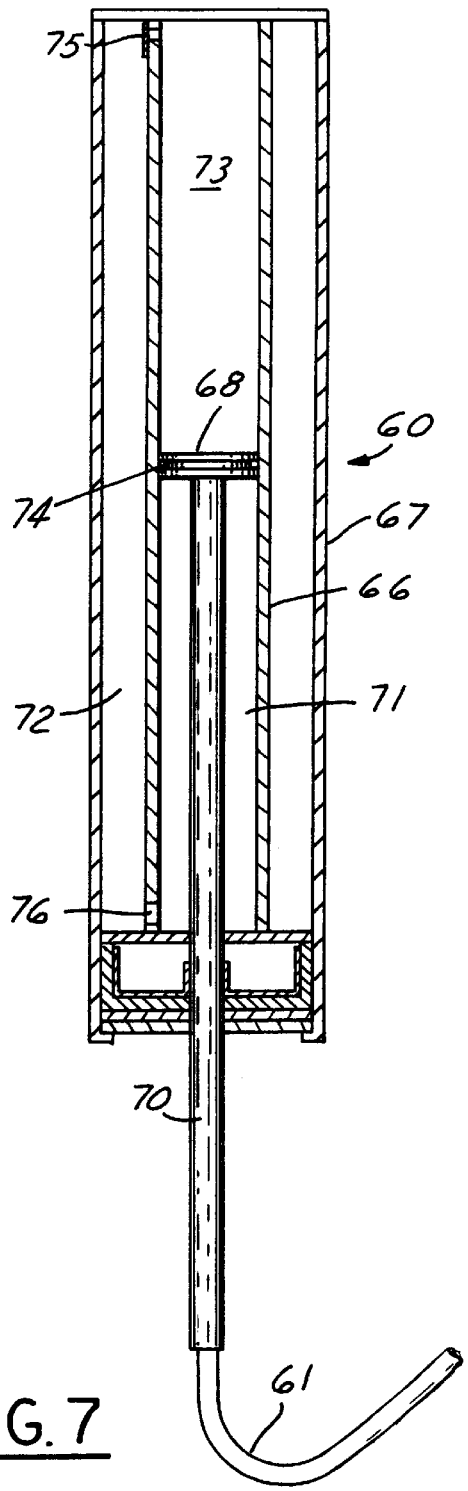
FIG. 7 is a schematic elevational view of another embodiment of this invention showing a remote located temperature compensated device for a gas spring strut.
Figure 8:
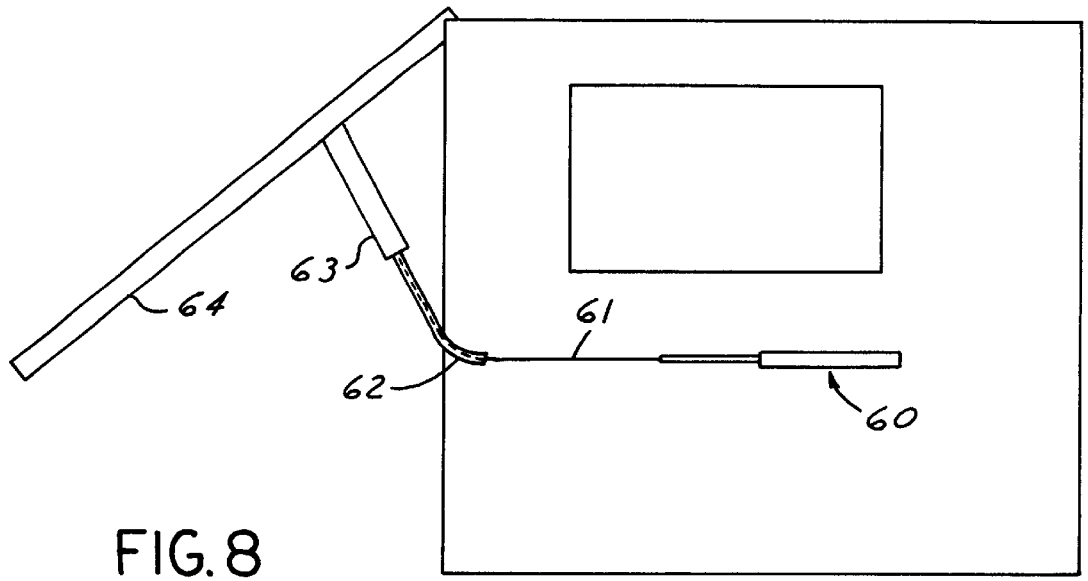
FIGS. 8 and 9 are schematic sectional views showing how the remote temperature compensated device of FIG. 7 can be packaged and used in an automobile.
Figure 9:
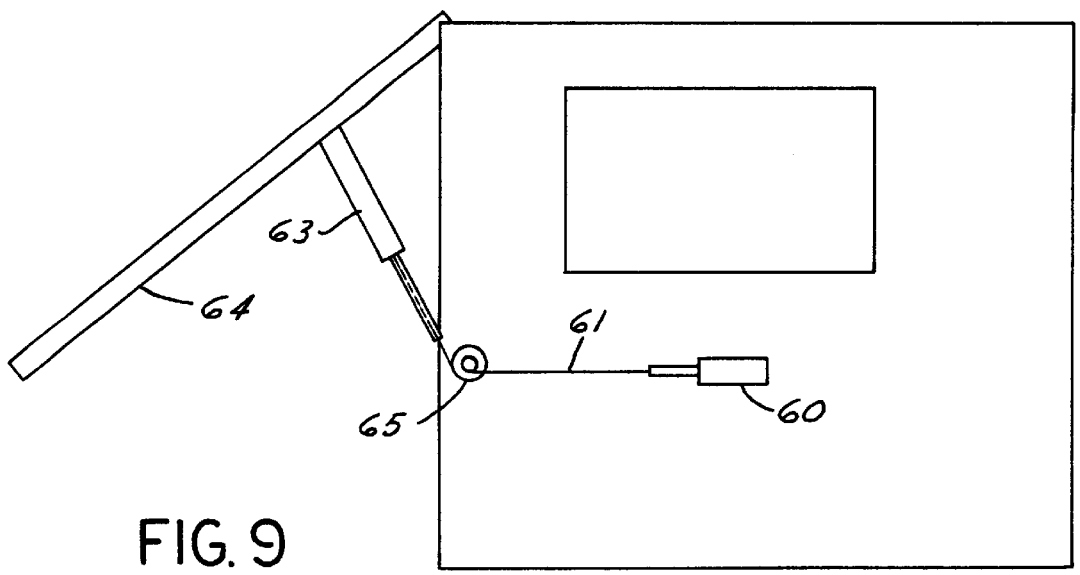

The temperature compensation device can also be packaged as a separate device and used with conventional struts. A diagram of a separately packaged device is shown in FIG. 7. Since the device 60 contains only the $CO_2$ gas, no partition is necessary. Because the temperature compensation device produces a tensile force as opposed to the compressive force of the liftgate strut, the device 60 can be used with a conventional strut and connected to the liftgate strut 63 by means of a flexible cable 61. The latter arrangement allows packaging of the device 60 in a variety of locations, for example, beneath a rear side window between the outer skin of the vehicle and the interior trim or within the liftgate 64 itself. The cable leads from the device 60 through a sheath 62 to an attachment on strut 63 on the liftgate 64 (FIG. 8). If a pulley is used, it can be a double pulley, one hub being twice the diameter of the other, providing a 2:1 mechanical advantage (FIG. 9). The latter will allow the stroke of the device 60 to be reduced by a factor of two.

Returning to FIG. 7, device 60 consists of an inner 66 and an outer 67 cylinder. Unlike the structure of FIG. 1, there is no partition needed between the two cylinders and the inner cylinder 66 need not have a special finish to promote sealing on its interior 69, nor does the piston 68 need to seal exceptionally well to the interior surface 69. Further, only a single gas or other condensible gas (i.e., $CO_2$) is needed. Such device can be packaged, as said earlier, in any convenient area of the vehicle, the only restriction being that a cable must pass from the device to either the liftgate or one of the conventional struts. When the liftgate is unlatched, the conventional strut begins to lift it. As the liftgate pulls on the cable, it extends the rod 70, compressing the $CO_2$ in the inner 71 and outer 72 chambers of the temperature compensating device. A vacuum is formed in the inner cylinder space 73 above the piston. By sizing the conventional strut and the temperature compensating device appropriately, the correct net lifting force is obtained. The O-ring 74 around the piston rod forms a reasonable gas-tight seal. However, the seal need not be perfect, since it must be maintained only for the few minutes or hours that the liftgate is open, but not for the lifetime of the vehicle. Further, any gas that does leak past seal 74 is purged on the next closing cycle. This is done by means of the one-way valve 75, which valve also need not be completely gas-tight. When the liftgate is closed, the pressure of the compressed gas in chamber 71 pushes the piston 68 upward. If any gas has leaked into the vacuum chamber, it is compressed and forced out through the valve 75. It may be desirable to deliberately design the seals to be leaky with a time constant of several seconds. This would ensure that even if the struts were not able to raise the liftgate without assistance (for instance, if there were a load of snow on the liftgate), that after the driver had manually helped to raise the liftgate fully, the increase in net lift force after leakage would help to keep the liftgate from sagging downwardly.

Since damping is provided by the conventional strut, no additional damping is required in the temperature compensating device. However, to prevent the cable from snapping back suddenly if it were disconnected with the liftgate in the open position, the aperture 76 in the bottom of the inner cylinder 66 could be sized small enough to provide a minimal damping effect sufficient for safety considerations.

The temperature compensating ability of the temperature compensating device comes from the use of $CO_2$ (or other condensible gas) that condenses to a liquid with a high vapor pressure over some lower portion of the operating temperature range. As a result, the pressure of the $CO_2$ gas decreases more rapidly with temperature than does that of the nitrogen in the conventional strut. Consequently, while the lifting force of the conventional strut decreases with temperature, the opposing force of the temperature compensating device decreases by like amount so that the net lifting force on the liftgate is more or less independent of temperature. For balanced tires on each side of the liftgate, the sizing of the components should be done such that the net force of the conventional strut and the temperature compensating device, operating on one side of the liftgate, equals the force of the conventional strut on the other side of the vehicle at some nominal temperature. At other temperatures, the forces on the two sides of the liftgate will not be equal, but the difference will be small enough that the imbalance will not be a problem. The temperature compensating device itself can be considerably smaller than a conventional strut since it need produce only on the order of one-half or less of the force produced by the conventional strut.

As indicated earlier in reference to FIG. 9, a pulley, attached to the vehicle with dual hubs of different sizes, will allow the cable from the temperature compensating device to be wrapped around a smaller hub and a second cable wrapped around the larger hub to continue to the strut or liftgate. In this way, a mechanical advantage is obtained, allowing the packaging of a shorter but higher force temperature compensating device.

Figure 10:
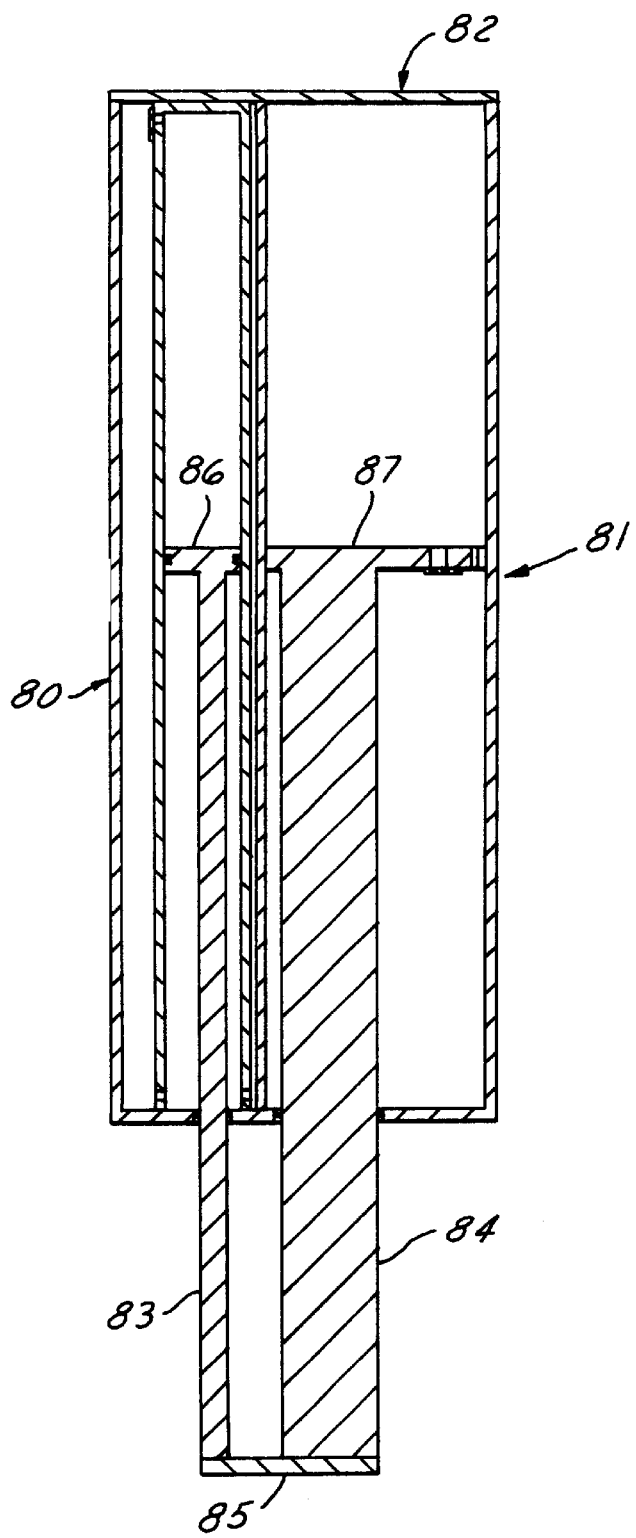
FIG. 10 is a schematic sectional view of yet still another embodiment of this invention showing an integrated automatic temperature compensating gas spring strut.

In yet still another embodiment (FIG. 10), the temperature compensating device 80 and conventional strut 81 can both be placed together in a single housing 82, but still retain their separate functions, each operating their own pistons 86, 87, as well as piston rods 83, 84 which are then co-joined at some remote location 85. The functions of each device and conventional strut remain the same as when the device and strut are remotely located from each other and connected by a cable as previously described.

While the invention has been shown and described in its preferred embodiments, it will be clear to those skilled in the arts to which it pertains that many changes and modifications may be made thereto without departing from the spirit and scope of the invention.

What is claimed is:

1. A method of making an automatic temperature compensated gas spring strut, comprising:

(a) providing an outer cylinder closed at one end and apertured at its other end to permit movement of said strut therethrough;

(b) nesting an inner cylinder within said outer cylinder in radially spaced relationship, the inner cylinder being apertured at opposite ends;

(c) partitioning the space between said cylinders into a first chamber adjacent the closed end of the outer cylinder and a second chamber remote from said closed end, said partitioning being effected by a one-way valve at the aperture of said inner cylinder which is adjacent said closed end of said first cylinder, said one-way valve preventing flow of gases from said second chamber to said first chamber;

(d) inserting a piston into sliding sealing relation with the interior of said inner cylinder, said piston having a piston rod extending from the piston and out through the aperture of said outer cylinder, said piston rod is connected to a separate gas spring strut to operate in opposition thereto and said first chamber being substantially devoid of gases;

(e) inserting a measured quantity of dry ice into said second chamber at ambient conditions and closing said second chamber while allowing movement of said piston rod therethrough; and (f) allowing the dry ice to sublime to create a condensable high pressure gas within said second chamber that is effective to exert a force on said piston rod that varies with ambient temperature conditions in the range of −40° C. to +80° C., the sublimed gas is effective to balance the force operating on said piston rod received from said gas strut to create a relatively constant net force acting on said piston regardless of ambient temperature conditions.

2. The method as in claim 1, in which in step (d), the sliding, sealing relation of said piston with said inner cylinder is effected by an O-ring or other sliding seal that does not create a perfect seal.

* * * * *